United States Patent
Vidoni et al.

(10) Patent No.: US 12,465,064 B2
(45) Date of Patent: Nov. 11, 2025

(54) ADSORBATES

(71) Applicant: DSM IP Assets B.V., Heerlen (NL)

(72) Inventors: Olivia Brigitte Vidoni, Kaiseraugst (CH); Christine Gothscheck, Kaiseraugst (CH); Kai Urban, Kaiseraugst (CH)

(73) Assignee: DSM IP Assets B.V. (NL)

( * ) Notice: Subject to any disclaimer, the term of this patent is extended or adjusted under 35 U.S.C. 154(b) by 786 days.

(21) Appl. No.: 17/298,765

(22) PCT Filed: Dec. 3, 2019

(86) PCT No.: PCT/EP2019/083480
§ 371 (c)(1),
(2) Date: Jun. 1, 2021

(87) PCT Pub. No.: WO2020/115036
PCT Pub. Date: Jun. 11, 2020

(65) Prior Publication Data
US 2022/0053798 A1    Feb. 24, 2022

(30) Foreign Application Priority Data
Dec. 4, 2018 (EP) .................................... 18210210

(51) Int. Cl.
| | | |
|---|---|---|
| A23K 20/147 | (2016.01) |
| A23K 20/158 | (2016.01) |
| A23K 20/28 | (2016.01) |
| A23K 40/35 | (2016.01) |
| A23K 50/10 | (2016.01) |

(52) U.S. Cl.
CPC .......... *A23K 20/147* (2016.05); *A23K 20/158* (2016.05); *A23K 20/28* (2016.05); *A23K 40/35* (2016.05); *A23K 50/10* (2016.05)

(58) Field of Classification Search
CPC ............................... A61K 31/04; Y02P 60/22
See application file for complete search history.

(56) References Cited

U.S. PATENT DOCUMENTS

| | | | | |
|---|---|---|---|---|
| 2003/0219467 A1* | 11/2003 | Miner | ................ | A61K 31/4412 424/442 |
| 2016/0166483 A1* | 6/2016 | Gadient | .................... | A61K 8/36 426/321 |
| 2016/0279056 A1* | 9/2016 | Zhao | .................... | A61K 31/485 |

FOREIGN PATENT DOCUMENTS

| | | |
|---|---|---|
| WO | 2017/137489 | 8/2017 |
| WO | 2018/149755 | 8/2018 |
| WO | 2018/149756 | 8/2018 |

OTHER PUBLICATIONS

Haisan, "The effect of feeding 3-nitrooxypropanol on methane emissions and productivity of Holstein cows in mid lactation", J. Dairy Sci. 2014, 97, pp. 3110-3119 (Year: 2014).*
Lopes, "Effect of 3-nitrooxypropanol on methane and hydrogen emissions, methane isotopic signature, and ruminant fermentation in dairy cows", J. Dairy Sci. 2016, 99, pp. 5335-5344 (Year: 2016).*
International Search Report for PCT/EP2019/083480 mailed Feb. 21, 2020, 3 pages.
Written Opinion of the ISA for PCT/EP2019/083480 mailed Feb. 21, 2020, 5 pages.

* cited by examiner

*Primary Examiner* — Changqing Li
(74) *Attorney, Agent, or Firm* — Jed C. Benson

(57) ABSTRACT

The present invention relates to storage stable adsorbates of 3-nitrooxypropanol and derivatives thereof as well as to the production of such adsorbates.

12 Claims, No Drawings

ADSORBATES

This application is the U.S. national phase of International Application No. PCT/EP2019/083480 filed Dec. 3, 2019 which designated the U.S. and claims priority to EP patent application Ser. No. 18/210,210.3 filed Dec. 4, 2018, the entire contents of each of which are hereby incorporated by reference.

The present invention relates to storage stable adsorbates of 3-nitrooxypropanol and derivatives thereof as well as to the production of such adsorbates.

The temperature of the air surrounding the earth is increasing, a process referred to as global warming. One of the main focuses to reduce this warming effect is to reduce the amount of greenhouse gases emitted into the atmosphere. Greenhouse gases are emitted from several different sources, both natural and artificial; however, the two sources with the most emphasis are the agricultural and fossil fuel industries. Within agriculture, ruminants and in particular cattle are the major contributors to the biogenic methane formation, and it has been estimated that the prevention of methane formation from ruminants would almost stabilize atmospheric methane concentrations.

3-Nitrooxy propanol and structural analogues thereof have been reported to be highly efficient in reducing the formation of methane in ruminants without affecting microbial fermentation in a way that would be detrimental to the host animal (WO2012/084629).

However, 3-nitrooxypropanol and structural analogues thereof have been found not to be efficiently retained in standard carrier systems commonly used in the feed industry such as silica under conventional storage conditions. Therefore, elaborate packaging system (e.g. sealed polyethylene bags or aluminium bags) are recommended to minimize the loss of the active during storage. Furthermore, small dosage units to minimize the risk of loss of active after opening the packaging device are often required, which however renders the product costlier.

Thus, there is an ongoing need to develop a cost efficient, free flowing, industrially handleably product form, which can be stored in ordinary polypropylene bags without significant loss of the active during storage.

Surprisingly, it has now been found that this object is achieved by a process for producing adsorbates in which a mixture comprising at least a compound of formula (I)

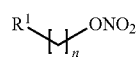

formula (I)

wherein
n is an integer from 1 to 15
$R^1$ is selected from the group consisting of H, $C_1$-$C_6$alkyl, phenyl, —OH, —$NH_2$, —CN, —COOH, —O(C=O)$R^8$, —NHC(=O)$R^8$, $SO_2NHR^8$, and —$ONO_2$, and
$R^8$ is $C_1$-$C_6$alkyl, phenyl, pyridyl such as preferably 2-pyridyl
with the proviso that when n is >3 the hydrocarbon chain may be interrupted by —O— or —NH—,
and gelatin (G) optionally in the presence of an edible solvent (S) and/or further conventional additives (A) is applied to a carrier (C).

For the purposes of the present invention, adsorbates are, in particular, preparations in which at least 10 wt.-%, in particular at least 20 wt.-%, preferably at least 30 wt.-%, particularly preferably at least 40 wt.-%, in particular at least 50 wt.-% of the components to be adsorbed (i.e. all constituents of the adsorbate without the carrier (C), i.e. the compound(s) of formula (I), the gelatin (G) and optionally the edible solvent (S) and the additives (A)) are present in the internal pore volume of the carrier (C). The internal pore volume of a carrier can be determined as void volume by the DPB (dibutyl phthalate) method DIN 53601.

Particular preference is given to adsorbates of which at least 60 wt.-%, preferably at least 70 wt.-%, in particular at least 80 wt.-%, is present in the internal pore volume of the carrier (C).

Compared with the preparations not containing gelatin the adsorbates of the present invention are distinguished by better handling and use advantages as well as a significantly improved storage stability, i.e. a retention of at least 90%, preferably of at least 93% most preferably of at least 95% of the compound of formula (I).

In addition, the adsorbates can easily be produced via conventional mixer techniques.

Compounds of Formula (I) to be Adsorbed

Suitable compounds of formula (I) according to the present invention are compounds of formula (I)

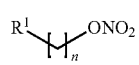

formula (I)

wherein
n is an integer from 1 to 15
$R^1$ is selected from the group consisting of H, $C_1$-$C_6$alkyl, phenyl, —OH, —$NH_2$, —CN, —COOH, —O(C=O)$R^8$, —NHC(=O)$R^8$, $SO_2NHR^8$, and —$ONO_2$, and
$R^8$ is $C_1$-$C_6$alkyl, phenyl, pyridyl such as preferably 2-pyridyl
with the proviso that when n is >3 the hydrocarbon chain may be interrupted by —O— or —NH— as well as mixtures thereof.

Particular advantageous compounds of formula (I) in all embodiments of the present invention are the compounds wherein n is an integer between 3 and 9 and $R^1$ is OH, COOH or —$ONO_2$ and with the proviso that if n is 4 the hydrocarbon chain may be interrupted by —NH— such as in particular the compounds of formula (II) $R^1$—$(CH_2)_2$—NH—$(CH_2)_2$—$ONO_2$ (II). Even more preferred are compounds of formula (I) wherein n is an integer between 3 and 9 and $R^1$ is OH, COOH or —$ONO_2$.

Even more advantageous compounds of formula (I) in all embodiments of the present invention are 3-nitrooxypropanol (CAS-No: 100502-66-7), 9-nitrooxynonanol, 5-nitroxy pentanoic acid (CAS 74754-56-6), 6-nitroxy hexanoic acid (CAS 74754-55-5), bis(2-hydroxyethyl)amine dinitrate (CAS 20830-49-3), 1,4-bis-nitrooxybutane (CAS 3457-91-8) and 1,5-bis-nitrooxypentane (CAS 3457-92-9). Most preferred in all embodiments of the present invention is 3-nitrooxypropanol.

The compounds of formula (I) preferably have a boiling point below 250° C. at 760 Torr, preferably a boiling point between 100 and 200° C. at 760 Torr.

The compounds according to the present invention are known and either commercially available or can be prepared in analogy to the processes as e.g. disclosed in WO2012/084629.

The (total) amount of the compound(s) (I) in the adsorbates according to the present invention is preferably at least 0.01 weight-%, more preferably at least 1 wt.-% such as at least 2.5 wt.-%, based on the total weight of the adsorbate (prior to any post treatment such as a coating).

Even more preferably, in all embodiments of the present invention, the (total) amount of the compound(s) of formula (I) in the adsorbate according to the present invention is selected in the range of from 0.01 to 25 wt.-%, more preferably in the range of from 0.5 to 20 wt.-%, most preferably in the range of 1 to 15 wt.-% or even in the range of 2 to 12 wt.-%, based on the total weight of the adsorbate.

Gelatin

Gelatin suitable for the purpose of the present invention encompasses type A and type B gelatin as well as mixtures thereof. The Type A gelatin may result from acid treatment of collagen and comprises acid bone, pig skin, poultry, fish, gelatin hydrolysate, or acid hide; and the Type B gelatin may results from alkali treatment of collagen and comprises lime bone gelatin.

The gelatin may be derived from the acid hydrolysis of collagen (e.g., acid bone gelatin or pig skin gelatin) or from the alkaline hydrolysis of collagen.

Particular preferred in all embodiments of the present invention is the use of hydrolysed gelatin (also known as gelatin hydrolysate), i.e. a gelatin which has undergone enzymatic digestion (hydrolysis) to downsize its molecular weight. Hydrolysed gelatin is available on the market from various sources, and is rich in glycine, proline, hydroxyproline, lysine and hydroxy lysine.

Even more preferably, the gelatin used for the purposes of the present invention is a low Bloom gelatin, i.e. a gelatin having a Bloom number of less than 100. The Bloom number describes the gel strength formed at 10° C. with a 6.67% solution gelled for 18 hours. Even more preferably, the Bloom number is less than 50, most preferably less than 25. It is even more preferred if the Bloom number of the gelatin is selected in the range of 0 to 50, more preferably selected in the range of 0 to 25, most preferably in the range of 0 to 20. Further preferred ranges encompass 0 to 15 and 0 to 10.

Particular suitable gelatin in all embodiments according to the present invention are commercially available under the tradename Hydro-P (acid hydrolysed porcine gelatine) or Pro-take from Rousselot.

The amount of the gelatin (G) in the adsorbate according to the present invention is selected in the range of 1 to 30 wt.-% (prior to any post-treatment such as a coating), based on the total weight of the adsorbate, more preferably in the range of 5 to 25 wt.-%, most preferably in the range of 7.5 to 20 wt.-%, such as most advantageously 10 to 18 wt.-%.

It is further preferred, in all embodiments of the present invention, that the ratio (weight/weight) of the compound of formula (I) to the gelatin (G) is selected in the range of 0.1 to 1, more preferably in the range of 0.25 to 0.8, most preferably in the range of 0.3 to 0.7.

Carrier (C)

Suitable substances for carriers (C) are all substances having a mean particle size of at least 25 µm and can adsorb the components to be adsorbed, i.e. the compound(s) of formula (I), the gelatin and optionally the edible solvent (S) and potential further additives (A).

It is well understood, that the carrier (C) must not display any adverse interactions with the components used in the inventive adsorbate and must be harmless for use as an aid in the feed and food industry.

Examples of suitable carriers are: low-molecular-weight inorganic or organic compounds and high-molecular-weight organic compounds of natural or synthetic origin as well as any mixtures thereof Examples of suitable low-molecular-weight inorganic carriers encompass kieselguhr, silica or silica derivatives such as for example magnesium silicate, silicon dioxide, silicates (e.g. precipitated silica) or silica gel, as well as salts such as for example limestone and magnesium sulfate.

Examples of suitable organic carriers encompass sugars such as for example glucose, fructose, sucrose, dextrins such as cyclodextrin as well as starch and cellulose products such as in particular wheat, corn starch and microcrystalline cellulose.

The mean particle size of the carrier (C) is preferably at least 25 µm, more preferably at least 50 µm, even more preferably at least 80 µm, most preferably at least 100 µm, such as in particular at least 300 µm.

In a further preferred embodiment the carriers used have a mean particle size D(v, 0.5) of less than 1000 µm, in particular of less than 800 µm, even more in particular of less than 500 µm.

The mean particle size as given herein refers to the D(v, 0.5) values. The particle sizes as given herein are measured by a Malvern Master Sizer 2000 following the recommendations outlined in ISO13320-1 for particle size analysis via laser diffraction methods (laser diffraction light scattering). During this laser diffraction measurement, particles are passed through a focused laser beam. The particles scatter light at an angle that is inversely proportional to their size. The angular intensity of the scattered light is then measured by a series of photosensitive detectors. The map of scattering intensity versus angle is the primary source of information used to calculate the particle size. For the measurement of the silica according to the present invention a dry powder feeder (Malvern Scirocco) was used.

Particular preference as carrier (C) in all embodiments according to the present invention is given to silicas and silica derivatives, for example silicon dioxides, silicates or silica gels having a mean particle size of at least 50 µm as well as mixtures thereof. Particular advantageous is precipitated silica. Such products are commercially available, for example Sipernat® 22 or Sipernat® 2200 (Evonik); Tixosil® 38 X or Tixosil® 68 (Solvay), Ibersil D-250 (IQE Group) or Zeofree 5170 (Huber).

The term precipitated silica is well known to a person skilled in the art and refers to silica which is produced by precipitation from a solution containing silicate salts. Precipitation is generally carried out by reacting an alkaline silicate solution with a mineral acid such as sulfuric acid in water.

In all embodiments of the present invention, preferably the precipitated silica has an average (mean) particle size D(v, 0.5)>200 µm. More preferably in all embodiments of the present invention the particle size is selected in the range of 200 µm to 400 µm, most preferably in the range of 250 µm to 380 µm such as in the range of 300 to 360 µm.

Advantageously, the silica or silica derivatives furthermore exhibit a pH selected in the range of pH 6 to 7 (measured as a 1% suspension in distilled water) as this further increases the retention of the active.

The carrier (C) advantageously constitutes an amount of at least 25 wt.-%, in particular of at least 30 wt.-%, preferably of at least 35 wt.-%, such as at least 40 wt.-%, based on the total weight of the adsorbate. Customarily, the carrier is present in a range from 25 to 85 wt.-%, preferably from about 30 to 85 wt.-%, more preferably from about 35 to 75 wt.-% such as in particular from about 40 to 60 wt.-%, based on the total weight of the adsorbate. These values are based on the uncoated adsorbate.

Edible Solvent

Suitable edible solvents suitable for diluting the compound(s) of formula (I) prior to the absorption onto the carrier encompass propylene glycol, edible oils (preferably corn oil, rapeseed oil, sunflower oil and middle chain triglycerides (MCT)), water and glycerol as well as any mixture thereof. Preferably, in all embodiments according to the present invention the edible solvent is propylene glycol or water The term "edible oil" in the context of the present invention encompasses any triglyceride such as vegetable oils or fats like corn oil, sunflower oil, soybean oil, safflower oil, rapeseed oil, peanut oil, olive oil or any mixture thereof.

The oils can be from any origin. They can be natural, modified or synthetic. If the oils are natural they can be plant or animal oils. The term "oil" in the con-text of the present invention thus also encompasses canola oil, sesame oil, hazelnut oil, almond oil, cashew oil, macadamia oil, mongongo nut oil, pracaxi oil, pecan oil, pine nut oil, pistachio oil, sacha Inchi (*Plukenetia volubilis*) oil, walnut oil or polyunsaturated fatty acids (="PUFAs") (for example arachidonic acid, eicosapentaenoic acid, docosahexaenoic acid and γ-linolenic acid) as well as the triglycerides of PUFAs and the esters of PUFAs, e.g. the ethyl esters of PUFAs.

Preferably the edible solvent and the edible oil are liquid at room temperature, i.e. a temperature in the range of from 15° C. to 30° C. Even more preferably, the edible solvent is selected such (and/or in such an amount) that it is suitable to solubilize the compound of formula (I).

It is furthermore preferred that the compound of formula (I) has a solubility in the edible solvent of at least 5 wt.-%, more preferably of at least 7.5 wt.-%, most preferable of at least 10 wt.-% measured at ambient temperature (i.e. about 22° C.).

The (total) amount of the edible solvent in the formulations according to the present invention may vary and is dependent on the solvent used. Preferably, the amount of the edible solvent is at least 5 wt.-%. Suitable ranges for the edible solvent present in the adsorbate according to the present invention are from 5 to 45 wt.-%, more preferably from 20 to 40 wt.-%, most preferably in the range of from 25 to 30 wt.-%, based on the total weight of the adsorbate.

Additives (A)

The formulations according to the present invention may furthermore contain small amounts of customary additives commonly used in the preparation of adsorbates for feed application such as in particular thickeners (e.g. gums or cellulose derivatives such as xanthan gum, karaya gum and/or ethylcellulose), anti-oxidants, preservatives, binders and/or flavorings.

The amount of such additives is preferably selected in the range of 0 to 10 wt-%, more preferably in the range of 0 to 5 wt.-%, most preferably in the range of 0 to 2.5 wt.-%, based on the total weight of the adsorbate. Most preferably, in all embodiments of the present invention no additive is present, i.e. the adsorbate consists essentially of at least one compound of formula (I), gelatin (G), an edible solvent (S) and a carrier (C) with all the definitions and preferences as given herein.

The term "consisting essentially of" in the context of the present invention means that the amount of any other ingredients than the compound(s) of formula (I), the edible solvent (S), the gelatin (G), the carrier (C) and the additive (A) is at most 7 wt.-%, preferably at most 5 wt.-%, more preferably at most 3 wt.-%. These other ingredients may e.g. be impurities or residual moisture introduced via the respective raw materials or processes used.

Production of the Adsorbates

The adsorbates of the present invention may be manufactured according to processes known to the person skilled in the art. Generally, to produce an adsorbate according to the present invention the components to be adsorbed, i.e. the compound(s) of formula (I) and the gelatin (G), optionally diluted in the edible solvent (S) and further optionally admixed with the additive(s) (A), are admixed with the carrier (C) e.g. using a mixer.

It is also possible that the adsorbate according to the present invention is prepared by diluting the compound of formula (I) and the gelatin, optionally in the presence of an edible solvent and further optionally admixed with the additive(s), with an organic solvent suitable for the preparation of food or feed products such as e.g. dichloromethane, followed by admixing the obtained dilution with silica followed by evaporation of the organic solvent. It is well understood, however, that the edible solvent (S) remains adsorbed within the pores of the carrier.

In a preferred embodiment, the adsorbate according to the present invention is prepared by solubilizing the compound (s) of formula (I) in an edible solvent, preferably in propylene glycol or water, followed by the addition of the gelatin and subsequent application of the resulting mixture to the carrier (C).

In isolated cases, it can be advantageous to preheat the components to be adsorbed (decrease in viscosity, in wetting properties), and also to supply or remove heat via the vessel wall and/or the mixing tools.

Coating

The adsorbates according to the present invention can additionally be coated with customary coatings in the art such as wax or fats. If present, such coating is generally applied in amounts of 5 to 50 wt.-% based on the total weight of the adsorbate. Advantageously, the coating comprises at least one wax and/or at least one fat, which has a dropping point of from 30 to 85° C.

The dropping point of a material as used herein refers to the temperature (in ° C.) when the material begins to melt under standardized conditions. Thus, the material is heated so long until it changes the state of matter from solid to liquid. The dropping point is the temperature when the first dropping is released from the material. The determination of the dropping point (Tropfpunkt) is carried out as described in the standard norm DIN ISO 2176.

Particularly suitable waxes to be used as coating in the context of the present invention include organic compounds consisting of long alkyl chains, natural waxes (plant, animal) which are typically esters of fatty acids and long chain alcohols as well as synthetic waxes, which are long-chain hydrocarbons lacking functional groups.

Particularly suitable fats to be used as coating in the context of the present invention include a wide group of compounds which are soluble in organic solvents and largely insoluble in water such as hydrogenated fats (or saturated fats) which are generally triesters of glycerol and fatty acids. Suitable fats can have natural or synthetic origin. It is possible to hydrogenate a (poly)unsaturated fat to obtain a hydrogenated (saturated) fat.

Preferred examples of waxes and fats to be used as coating according to the present invention are glycerine monostearate, carnauba wax, candelilla wax, sugarcane wax, palmitic acid, stearic acid hydrogenated cottonseed oil, hydrogenated palm oil and hydrogenated rapeseed oil as well as mixtures thereof.

In a preferred embodiment according to the present invention, the adsorbates are uncoated.

Adsorbates and their Use

The invention further comprises adsorbates which are obtainable according to the abovementioned processes. These adsorbates are distinguished by an increased retention of the compound(s) of formula (I) and at the same time are simple to produce on an industrial scale.

In a preferred embodiment, the invention relates to an adsorbate (I), which comprises
- (i) from 1 to 40 wt-%, preferably 1 to 35 wt.-%, most preferably 1 to 30 wt.-%, based on the total weight of the adsorbate, of a compound of formula (I), and
- (ii) from 5 to 45 wt-%, based on the total weight of the adsorbate, of at least one edible solvent, and
- (iii) from 5 to 25 wt-%, based on the total weight of the adsorbate, of a gelatin, and
- (iv) at least 30 wt-%, based on the total weight of the adsorbate, of silica, and
- (v) from 0 to 10 wt-%, based on the total weight of the adsorbate, of an additive.

Further suitable adsorbates (I) are adsorbates, wherein the compound of formula (I) is 3-nitrooxypropanol and the amount thereof is selected in the range from 5 to 40 wt.-%, 5 to 35 wt.-%, 5 to 30 wt.-%, 10 to 40 wt.-%, 10 to 35 wt.-%, 10 to 30 wt.-%, 15 to 40 wt.-%, 15 to 35 wt.-% or 15 to 30 wt.-%, based on the total weight of the adsorbate.

In a particularly preferred embodiment, the invention relates to an adsorbate (II), which comprises
- (i) from 1 to 25 wt-%, based on the total weight of the adsorbate, of a compound of formula (I), and
- (ii) from 5 to 45 wt-%, based on the total weight of the adsorbate, of at least one edible solvent, and
- (iii) from 5 to 25 wt-%, based on the total weight of the adsorbate, of a gelatin, and
- (iv) at least 30 wt-%, based on the total weight of the adsorbate, of silica, and
- (v) from 0 to 10 wt-%, based on the total weight of the adsorbate, of an additive.

Further suitable adsorbate (II) are adsorbates as outlined above, wherein the compound of formula (I) is 3-nitrooxypropanol and the amount thereof is selected in the range from 5 to 25 wt.-%, 10 to 25 wt.-% or 15 to 25 wt.-%, based on the total weight of the adsorbate.

In a more preferred embodiment, the present invention relates to an adsorbate (III) consisting of
- (i) 2 to 20 wt-%, based on the total weight of the adsorbate, of a compound of formula (I), and
- (ii) 10 to 45 wt-%, based on the total weight of the adsorbate, of an edible solvent, and
- (iii) 7.5 to 20 wt-%, based on the adsorbate, of a gelatin, and
- (iv) at least 35 wt-%, based on the total weight of the adsorbate, of silica, and
- (v) 0 to 5 wt-%, based on the total weight of adsorbate, of an additive.

In an especially preferred embodiment, the present invention relates to an adsorbate (IV) consisting of
- (i) 2 to 15 wt-%, based on the total weight of the adsorbate, of a compound of formula (I), and
- (ii) 20 to 40 wt-%, based on the total weight of the adsorbate, of an edible solvent, and
- (iii) 10 to 18 wt-%, based on the total weight of the adsorbate, of a gelatin, and
- (iv) at least 35 wt-%, based on the total weight of the adsorbate, of silica, and
- (v) 0 to 2.5 wt-%, based on the total weight of the adsorbate, of an additive.

A very specific adsorbate of the present invention is an adsorbate (V) consisting of
- (i) 2 to 12 wt-%, based on the total weight of the adsorbate, of 3-nitrooxypropanol, and
- (ii) 20 to 40 wt-%, based on the total weight of the adsorbate, of propyleneglycol or water, and
- (iii) 10 to 18 wt.-%, based on the total weight of the adsorbate, of a gelatin, and
- (iv) at least 40 wt-%, based on the total weight of the adsorbate, of precipitated silica.

The adsorbates according to the present invention can be used as such or admixed into feed products. They are also usable in complex matrices, such as for example premixes used in the animal feed industry in particular for ruminants.

Feed products, especially feed pellets or concentrated supplements, comprising the adsorbate according to the present invention are also an embodiment of the present invention as well as their manufacturing process.

Feed pellets can e.g. be prepared by feeding the adsorbate according to the present invention to a suitable equipment, followed by providing into the equipment heated air or steam to increase the temperature and/or moisture content of the ingredient mixture, followed by pouring the heated ingredient mixture through a die for obtaining pellets and subsequently drying and collecting the pellets.

Cows may also be fed total mixed rations (TMR), where all the dietary components, e.g. forage, silage, concentrate, and the adsorbate according to the present invention are admixed before serving.

Further Method and Uses

In another embodiment, the invention relates to the use of a gelatin (G) with all the definitions and preferences as given herein to enhance the retention of a compound of formula (I) adsorbed on a carrier (C). Preferably, the retention is at least 90%, preferably at least 93% most preferably at least 95%.

In another embodiment, the present invention relates to a method of reducing the evaporation and/or volatility of a compound of formula (I) adsorbed onto a carrier (C), respectively to a method of improving the retention of a compound of formula (I) adsorbed onto a carrier (C), said method comprising admixing a compound of formula (I) with all the definitions and preferences as given herein with gelatin and optionally an edible solvent and/or an additive prior to its adsorption onto the carrier. In an even more preferred embodiment, the method comprises the preparation of an adsorbate as defined herein, as these adsorbates are particular suitable to effectively retain the active over storage.

In another embodiment, the present invention relates to method of reducing the evaporation and/or volatility respectively to method of improving the retention of a compound of formula (I) adsorbed onto a carrier, said method comprising the step of preparing an adsorbate according to the present invention with all the preferences and definitions as given herein. Preferably, the adsorbate exhibits a retention of at least 96%, preferably of at least 93%, most preferably of at least 95%.

The term 'retention' as used herein refers to a retention of the compound of formula (I) with all the definitions and preferences as given herein over a storage time of 12 weeks (polypropylene bag/tube, 25° C.; 50% relative humidity (r.H.)).

In a further advantageous embodiment, the invention relates to a method to enhance the retention of a compound of formula (I) with all the definitions and preferences as given herein in a feed product, said method comprising the step of adding the compound of formula (I) in the form of an adsorbate according to the present invention to the feed composition.

In a further embodiment, the invention relates to a method to enhance the storage stability of a feed product comprising a compound of formula (I), respectively reducing the evaporation (volatility) of a compound of formula (I) in a feed product, said method comprising the step of adding the compound of formula (I) in the form of an adsorbate according to the present invention to the feed composition.

Preferably, the amount of the adsorbate in the feed product is selected such, that the amount of the compound of formula (I) is in the range of 0.01 to 50 g/kg of feed product, preferably in the range of 0.02 to 25 g/kg of feed product, most preferably in the range of 1 to 10 g/kg of feed product.

The term feed product refers in particular to ruminant feed compositions as well as to feed additives.

The present invention is also directed to the use of the adsorbates according to the present invention with all preferences as given above for reducing the methane production in ruminants such as cattle, especially dairy cows, sheep and goats.

The present invention also relates to the use of the adsorbates of the present invention for reducing the methane production in ruminants calculated in liters per kilogram of dry matter intake by at least 10% when measured in metabolic chambers. Preferably, the methane reduction is at least 15%, more preferably at least 20%, even more preferably at least 25%, most preferably at least 30%. Alternative methane emission measurements may also be used like using a laser beam or for dairy ruminants correlating methane production to the VFA profile in milk.

The invention is illustrated by the following non-limiting examples.

EXAMPLES

Material: Gelatin: Hydro-P and Rousselot© Pro-take™ P (from Rousselot)
Silica: Sipernat 220 (from Evonik)
Water: distilled water
Propyleneglycol (PG): Thommen_Furlen AG
3-Nitrooxypropanol: prepared according to WO2012/084629

Preparation of a Silica/3-Nitrooxypropanol Adsorbate (Reference)

To 100 g of silica gently stirred in a beaker 100 g of solution of a 3-nitrooxypropanol (20 wt.-%) in PG was added at RT. The addition was completed after 15 min, and the free-flowing product was collected.

Preparation of a Silica/3-Nitrooxypropanol/Gelatin Adsorbate (Based on Water)

To 35 g of a solution of 3-nitrooxypropanol (20 wt.-%) in water placed in a 150 mL beaker were added 15 g of gelatin (Invention-I: Hydro-P; Invention-II: Pro-take P) (weight ratio 3-nitrooxypropanol/gelatin=0.47). The obtained solution was mixed for 45 min at RT, and afterwards added to 50 g of silica until complete adsorption. Then, the free-flowing product was collected.

Preparation of a Silica/3-Nitrooxypropanol/Gelatin Adsorbate (Based on PG)

To 35 g of a solution of 3-nitrooxypropanol (20 wt.-%) in PG placed in a 150 mL beaker were added 15 g of gelatin (Invention-III: Hydro-P; Invention IV: Pro-take P). The suspension was mixed for 45 min at RT, and afterwards added to 50 g of silica until complete adsorption. Then the free-flowing product was collected.

Stability Study:

All samples were stored on closed polypropylene (PP) tube at 25° C. and 50% r.H. For each adsorbate five samples were assessed.

The concentration of 3-nitrooxypropanol was determined by HPLC using an Agilent High Performance Liquid Chromatography 1260 Infinity system, using an Aquasil C18, 150×3 mm, 3 µm column and detecting at 210 nm. The column oven was set to 23° C., the autosampler not temperature controlled. The mobile phase consisted of mobile phase A (940 mL Milli-Q-water+60 ml acetonitrile+1 mL methane sulfonic acid) and mobile phase B (800 ml Milli-Q-water+200 ml acetonitrile+1 mL methane sulfonic acid) which were used in gradient mode (0 min: 0% B, 15 min: 0% B, 15.5 min: 100% B, 21 min: 100% B, 21.5 min: 0% B, 25 min: 0% B (=end of run)) with a flow of 0.4 ml/min. The results (as relative concentration to the initial value set to 100%) are presented Table 1.

TABLE 1

| Sample | Retention [%] | | | | |
|---|---|---|---|---|---|
| | 1 week | 2 weeks | 3 weeks | 1 months | 3 months |
| Invention-I | 100 | 100 | 99.7 | 98.8 | 98.7 |
| Invention-III | 100 | 100 | 100 | 100 | 100 |
| Invention-II | 100 | 100 | 100 | 100 | 99.7 |
| Invention-IV | 100 | 100 | 100 | 100 | 100 |
| Reference (w/o gelatin) | 96.4 | 96.4 | 92.7 | 96.4 | 94.5 |

As can be retrieved from table 1, the use of gelatin resulted in an improved retention of the active upon long time storage.

The invention claimed is:

1. A method of producing a storage stable adsorbate comprising:
    (a) forming a mixture which comprises:
        (a1) 1 to 25 wt-%, based on total weight of the adsorbate, of 3-nitrooxypropanol (3-NOP), and
        (a2) 5 to 25 wt-%, based on total weight of the adsorbate, of a gelatin, wherein
        the 3-NOP and the gelatin are present in amounts to provide a weight ratio (w/w) of the 3-NOP to the gelatin of 0.1 to 1;
    (b) applying the mixture of step (a) to at least 30 wt-%, based on total weight of the adsorbate, of a porous precipitated silica carrier, and thereafter
    (c) allowing at least 50 wt-% of the mixture of step (a) to be adsorbed within internal pores of the silica carrier, wherein
    the gelatin is present in the mixture in an amount sufficient such that 98.7% to 100% of the 3-NOP is retained within the internal pores of the silica carrier after a storage time of 3 months in a polypropylene container at 25° C. and 50% relative humidity.

2. The method according to claim 1, wherein the mixture further comprises (a3) at least one edible solvent selected from the group consisting of propylene glycol, corn oil, rapeseed oil, sunflower oil, middle chain triglyceride (MCT), water, glycerol and combinations thereof.

3. The method according to claim 2, wherein the adsorbate comprises, based on the total weight of the adsorbate:

from 5 to 45 wt-% of the at least one edible solvent, and from 0 to 10 wt-%, based on the total weight of the adsorbate, of an additive.

4. The method according to claim 2, wherein the mixture consists essentially of (a1) the 3-NOP, (a2) the gelatin and (a3) the edible solvent.

5. The method according to claim 4, wherein the edible solvent is propylene glycol or water.

6. The method according to claim 5, wherein the adsorbate comprises, based on the total weight of the adsorbate:
   (i) 2 to 12 wt-% of the 3-NOP,
   (ii) 20 to 40 wt-% of the propylene glycol or the water,
   (iii) from 10 to 18 wt-% of the gelatin, and
   (vi) at least 40 wt-% of the precipitated silica carrier.

7. The method according to claim 1, wherein the gelatin has a bloom value in a range of 0 to 50.

8. The method according to claim 1, wherein the weight ratio (w/w) of the 3-NOP to the gelatin is from 0.25 to 0.8.

9. The method according to claim 1, wherein the weight ratio (w/w) of the 3-NOP to the gelatin is from 0.3 to 0.7.

10. The method according to claim 1, wherein step (c) is practiced such that at least 60 wt. % of the mixture of step (a) is adsorbed within the internal pores of the silica carrier.

11. The method according to claim 1, wherein step (c) is practiced such that at least 70 wt. % of the mixture of step (a) is adsorbed within the internal pores of the silica carrier.

12. The method according to claim 1, wherein step (c) is practiced such that at least 80 wt. % of the mixture of step (a) is adsorbed within the internal pores of the silica carrier.

* * * * *